United States Patent [19]

Hayashi et al.

[11] Patent Number: 5,102,634
[45] Date of Patent: Apr. 7, 1992

[54] METHOD FOR PURIFYING EXHAUST GAS AND APPARATUS

[75] Inventors: Hiroaki Hayashi, Takatsuki; Kunio Sano, Ako; Yasushi Hattori, Ibaraki; Kazuyoshi Nishikawa, Himeji, all of Japan

[73] Assignee: Nippon Shokubai Kagaky Kogyo Co., Ltd., Osaka, Japan

[21] Appl. No.: 745,960

[22] Filed: Aug. 12, 1991

Related U.S. Application Data

[63] Continuation of Ser. No. 466,630, Jan. 17, 1990, abandoned.

[51] Int. Cl.$^5$ .............................................. B01D 53/36
[52] U.S. Cl. .................................. 423/210; 423/213.7; 423/245.1; 423/245.3
[58] Field of Search ................ 423/213.7, 215.5, 219, 423/210, 245.1, 245.3

[56] References Cited

U.S. PATENT DOCUMENTS

| | | | |
|---|---|---|---|
| 3,257,163 | 6/1966 | Stiles | 423/213.7 |
| 3,259,454 | 7/1966 | Michalko | 423/213.5 |
| 4,192,857 | 3/1980 | Tellier et al. | 423/219 |
| 4,407,785 | 10/1983 | Pfefferle | 423/245.1 |

FOREIGN PATENT DOCUMENTS

| | | | |
|---|---|---|---|
| 1316139 | 12/1962 | France | 423/213.7 |
| 592436 | 1/1978 | Japan | 423/245.3 |
| 81428 | 5/1983 | Japan | 423/210 |
| 2065629 | 7/1981 | United Kingdom | 423/247 |

OTHER PUBLICATIONS

Patent Abstracts of Japan, vol. 7, No. 175 (C-179)[1320], 3rd Aug. 1983, p. 118 C 91.
Patent Abstracts of Japan, vol. 6, No. 24 (C-91)[902], 12th Feb. 1982, p. 118 C 91.
Patent Abstracts of Japan, vol. 4, No. 42 (C-5)[524], 3rd Apr. 1980, p. 71 C 5.
a

*Primary Examiner*—Jeffrey E. Russel

[57] ABSTRACT

A method for purifying an exhaust gas containing catalyst poison(s) by subjecting the gas to a catalytic treatment which comprises previously passing the gas through a layer packed with a highly activated alumina to remove the catalyst poison(s); and an apparatus for purifying exhaust gas containing catalyst poison(s) by subjecting the gas to a catalytic treatment, wherein a layer packed with a highly activated alumina for removal of the catalyst poison(s) and a layer packed with an oxidation catalyst for removal of harmful substances in the gas are separately arranged.

11 Claims, No Drawings

METHOD FOR PURIFYING EXHAUST GAS AND APPARATUS

This application is a continuation of application Ser. No. 07/466,630, filed Jan. 17, 1990, now abandoned.

BACKGROUND OF THE INVENTION

1. Field of the Invention

This invention relates to a method for purifying an exhaust gas and an apparatus therefore, and more specifically it relates to a method for purifying an exhaust gas containing catalyst poison(s) which comprises passing the gas, prior to its catalytic treatment, through a layer packed with a highly activated alumina to remove the catalyst poison(s) in the gas and an apparatus therefore.

2. Description of the Prior Art

Recently, there have widely been adopted methods of purifying an exhaust gas for prevention of air pollution or removal of offensive odor, which comprise catalytically treating the exhaust gas to remove harmful substance(s) in the gas which become(s) a cause of air pollution or offensive odor, for example, organic substance(s) contained in the exhaust gas from organic acid-production plants or aldehyde(s) contained in the exhaust gas from drying oven for paint coating and baking.

However, exhaust gases generally contain, besides harmful substances, dusts, tarry substances, which shall hereinafter be referred to as tar-like substances, organometal compounds, silicon compounds, phosphorus compounds, etc, which act as catalyst poisons to oxidation catalysts used for catalytic treatment of exhaust gases and become a cause to strikingly lower the performances and life of the catalyst. Particularly, organometal compounds, organosilicon compounds, organophosphorus, compounds, etc. have a striking catalyst poison effect. For example, organosilicon compounds and organophosphorus compounds are widely used as antifoamer in production of chemical products such as coatings and inks or additives for these products, or as flame retardants for as plastics, and hence, the exhaust gases from generation sources treating these products usually contain a trace amount of organosilicon compounds and organophosphorus compounds. These compounds in the exhaust gases oxidatively decompose on the oxidation catalysts for treatment of the exhaust gases and mask the active surface of the catalysts to strikingly lower the catalytic activity.

As methods for removal of such catalyst poisons, there have for example been proposed a pretreatment method using as an adsorbent active carbon, silica gel, activated alumina or zeolite in Japanese Laid-Open Patent Publication No. 138054/1977, and a pre-treatment method wherein the exhaust gas is in advance passed through a layer packed with alumina at a temperature of 150° C. or more in Japanese Patent Publication No. 20333/1986.

However, it has been revealed according to studies of the present inventors that there are still problems both in the pre-treatment method using the above adsorbents and in the pre-treatment using the alumina-packed layer that the catalyst poisons cannot sufficiently be removed so that deterioration of the oxidation catalysts for treatment of the exhaust gases and shortening of life of the catalyst are brought about.

Further, in the pre-treatment method using the alumina-packed layer, since oxidative decomposition of the tar-like substances contained in the exhaust gases is inadequate, the tar-like substances are adsorbed in the alumina-packed layer and polymerized and further carbonized and deposited as carbon. As a result, removal of the above catalyst poisons, particularly organometal compounds, such as organosilicon compounds and organophosphorus compounds in the alumina-packed layer is strikingly reduced, and thus the effect of removal of the catalyst poisons by the alumina-packed layer is strikingly spoiled. Furthermore, since the carbon deposited on the alumina layer has a relatively lower ignition point, it abruptly ignites and burns when the temperature of the alumina-packed layer is raised, for example by heat transferred from the oxidation catalyst layer for treatment of the exhaust gases or by heat accumulation due to shutdown of the apparatus, etc. This causes various problems such as heat deterioration of the catalyst for exhaust gas treatment and damage of the apparatus, which are undesirable from the viewpoint of safety, too.

An object of the present invention is to solve the above problems by providing a method for purifying an exhaust gas whereby the organometal compounds such as organosilicon compounds, organophosphorus compounds and the like, which are catalyst poisons of the oxidation catalysts for exhaust gas treatment, as well as tar-like substances and the like are efficiently removed, and an apparatus for purifying the exhaust gas suitable for practice of the said method.

SUMMARY OF THE INVENTION

As a result of strenuous studies, the present inventors have found that the above object can be accomplished by, in purification of an exhaust gas containing catalyst poison(s) by catalytic treatment, previously passing the exhaust gas through a layer packed with a highly activated alumina which can be obtained by depositing at least one catalyst component selected from noble metal and oxides of heavy metals on alumina, and have completed the present invention based on this finding.

Thus, the present invention relates to a method for purifying an exhaust gas containing catalyst poison(s) by subjecting the gas to a catalytic treatment, which comprises beforehand passing the gas through a layer packed with a highly activated alumina to remove the catalyst poison(s).

The present invention further relates to an apparatus for purifying an exhaust gas containing catalyst poison(s) by subjecting the gas to a catalytic treatment, wherein a layer packed with a highly activated alumina for removal of the catalyst poison(s) and a layer packed with an oxidation catalyst for removal of harmful substances in the gas are separately provided.

EXPLANATION OF THE PREFERRED EMBODIMENT

The present invention is described in more detail below.

The highly activated alumina used in the invention is one obtained by depositing on alumina at least one catalyst component selected from noble metals such as platinum, palladium and silver, and oxides of heavy metals such as iron, manganese, chromium, copper, nickel and cobalt, for example $Fe_2O_3$, $CuO$, $MnO_2$, $Mn_2O_3$, $Cr_2O_3$, $NiO$, $CoO$ and $Co_3O_4$ which are generally used as oxidation catalysts for catalytic treatment of exhaust gases.

There may be used as the aluminas those which are generally used, for example activated aluminas such as alpha-alumina and gamma-alumina, and activated aluminas having specific surface area of 10 m²/g or more, particularly 50 to 500 m²/g, are preferably used. The amount of the catalyst component to be deposited is 0.05 to 2 wt. %, preferably 0.1 to 1 wt. %, based on the weight of the alumina. If the amount of the catalyst component deposited is below 0.05 wt. %, the catalyst poisons and tar-like substances cannot sufficiently be removed. Since catalyst poisons and tar-like substances contained in exhaust gases are only in a trace amount, it is not necessary to use the catalyst component in an amount beyond 2 wt. %. Such an excess use rather brings about an economical disadvantage due to an increase in cost of the highly activated alumina by use of the expensive catalyst component.

There is no particular limitation on the method of preparation of the above highly activated aluminas, and they can be prepared according to methods generally used for preparation of this kind of catalysts. Shapes of the highly activated aluminas may be any of spherical, cylindrical, honeycomb and other shapes, and suitable size thereof is, for example, the order of about 2 to 8 mm (particle size) in case of spherical shape and the order of about 1 to 5 mm (diameter) and X about 3 to 8 mm (height) in case of cylindrical shape.

Although a highly activated alumina wherein the catalyst component is deposited in an amount within the above range on each of the alumina particles is preferred as the highly activated alumina used in the invention in the point that a uniform catalyst poison-removing reaction can be attained, a highly activated alumina wherein an alumina deposited with the catalyst component in a high concentration is uniformly mixed with an alumina deposited with the catalyst component in a low concentration or with an alumina deposited with no catalyst component so that the amount of the deposited catalyst component(s) as a whole falls within the above range can also be used so long as the catalyst poison-removing reaction can be carried out uniformly in an allowable extent.

By use of the above highly activated alumina-packed layer, oxidative decomposition of the catalyst poisons can be accelerated and the catalyst poisons can still further effectively be removed compared to the usual alumina-packed layers. Furthermore, the tar-like substances, which become a cause of carbon deposition on the alumina layer can also be effectively oxidatively decomposed.

According to the method of purifying an exhaust gas of the invention, an exhaust gas containing catalyst poison(s) is first passed through a layer packed with the above highly activated alumina to remove the catalyst poison(s) prior to purification of the exhaust gas by the catalytic treatment.

The condition of the pre-treatment using this highly activated alumina-packed layer is varied depending on the kind and concentration of the harmful substances contained in the exhaust gases, the kind and concentration of the catalyst poisons in the exhaust gases, etc., and can appropriately be determined, in practice of the pre-treatment, taking these factors into account. Usually, the pre-treatment is suitably carried out at a temperature of the order of about 130 to 500° C., under normal pressure, at a space velocity (SV) of the order of about 10,000 to 50,000 hr$^{-1}$. This pre-treatment is suitably carried out in the presence of molecular oxygen, generally air as an oxygen source for accelerating the removal of the catalyst poisons by oxidation or combustion, as is the case in the general catalytic treatment of exhaust gases.

The exhaust gas from which the catalyst poison(s) was(were) removed by passing through the above highly activated alumina layer is then passed through an oxidation catalyst-packed layer to remove the harmful substances in the exhaust gas.

Any oxidation catalyst capable of oxidatively removing the harmful substances may be used as the oxidation catalyst for this oxidation catalyst-packed layer. Specifically, there may be used a catalyst wherein at least one member selected from noble metals such as platinum, palladium and silver as well as oxides of heavy metals such as iron, chromium, copper, nickel and cobalt, for example $Fe_2O_3$, $MnO_2$, $Mn_2O_3$, $Cr_2O_3$, NiO, CoO, $Co_3O_4$, CuO, etc. deposited on a suitable carrier such as alumina, as generally used as oxidation catalysts for treatment of exhaust gases. The amount of the catalyst deposited is usually the order of about 0.1 to 2 wt. % based on the weight of the carrier. The shape of the carrier is not particularly limited as is the case with the alumina used in the above highly activated alumina, and may be any of spherical, cylindrical, monolithic and other shapes, and monolith the size of the carrier can appropriately be determined within the range specified in respect of the above highly activated alumina. The oxidation catalyst may be either identical to or different from the catalyst component used in the above highly activated alumina, and can appropriately be determined in accordance with the kind of the harmful substances in the exhaust gas to be purified, etc.

The apparatus for purification of exhaust gases of the invention comprises the above highly activated alumina-packed layer and the oxidation catalyst-packed layer, and it is necessary to separately arrange the highly activated alumina-packed layer and the oxidation catalyst-packed layer. Although the interval between the highly activated alumina-packed layer and the oxidation catalyst-packed layer varies depending on the kind and concentration of the harmful substances contained in the exhaust gas to be treated, the treatment velocity and treatment amount of the exhaust gas, the shape of the exhaust gas purification apparatus, etc., and cannot be definitely specified, the interval is usually 10 to 200 mm, preferably 30 to 100 mm. If the above interval is below 10 mm, the ignition and combustion of the deposited carbon and ter-like substances cannot sufficiently be prevented, and on the other hand, even if an interval exceeding 200 mm is adopted, a better effect of preventing ignition and combustion cannot be expected.

Since the highly activated alumina-packed layer and the oxidation catalyst-packed layer are provided at intervals of the above range in the exhaust gas purification apparatus of the invention, temperature elevation of the highly activated alumina-packed layer by heat transferred from the oxidation catalyst-packed later is prevented and thus the ignition and combustion of the carbon and tar-like substances in the alumina layer, which occur in practice of the pre-treatment method disclosed in the Japanese Patent Publication No. 20333/1986, can effectively be prevented.

The method and apparatus for exhaust gas purification of the invention can be applied to various exhaust gases. Specific examples of these exhaust gases to be used include exhaust gases containing organic solvents, aldehydes, etc. from drying oven for coating and baking; exhaust gases containing xylene, etc. from drying oven used for printing on metals or preparation of colored iron plate; exhaust gases containing toluene, etc. from drying oven for applied adhesives; exhaust gases containing acetic esters, etc. from drying oven used in preparation of adhesive tapes; exhaust gases containing naphtha, etc. from drying oven used in offset printing; and exhaust gases from steps for preparation of flame retardant resins or steps for preparation of coal-heavy oil mixed fuels.

Since the catalyst poisons can effectively be removed by the present invention compared to the conventional methods, it becomes possible to prevent the oxidation catalyst for exhaust gas treatment from being poisoned and maintain its performances for a long period of time. Further, according to the invention, tar-like substances can also effectively be removed and thus, lowering of the catalytic activity, damage of the apparatus, etc. due to their combustion can be prevented.

EXAMPLE

The present invention is further detailedly explained below by description of examples.

In Examples 1 to 4 and Comparative example 1, five test exhaust gas-treating reactors were arranged in parallel, and an exhaust gas from preparation of petroleum products is passed as an exhaust gas through these reactors to simultaneously carry out Examples 1 to 4 and Comparative example 1.

EXAMPLE 1

As the oxidation catalyst removing the harmful substances in an exhaust gas, namely the catalyst for exhaust gas treatment, was used an oxidation catalyst wherein 0.25 wt. % of platinum was deposited on granular gamma-alumina having an average particle size of 5 mm $\phi$ and a specific surface area of 250 m$^2$/g. The catalyst was packed into the reactor to form an oxidation catalyst-packed layer having a layer length of 100 mm. In the first part of the oxidation catalyst-packed layer was packed a highly activated alumina wherein 0.2 wt. % of palladium was deposited on gamma-alumina having an average particle size of 3.2 mm $\phi$ and a specific surface area of 250 m$^2$/g, whereby a highly activated alumina-packed layer having a layer length of 100 mm as the pre-treatment layer was formed.

The exhaust gas from preparation of petroleum products (silicon content 0.13 mg/Nm$^3$; hydrocarbon content 1700 ppm v/v) was introduced into the reactor under the following conditions:

Temperature at the inlet of the pre-treatment layer: 300° C.

Space velocity (SV) 20,000 hr$^{-1}$ in both the pre-treatment layer and the oxidation catalyst-packed layer for exhaust gas treatment.

After the exhaust gas was passed for 1,500 hours, the oxidation catalyst and highly activated alumina were taken out. The amount of silica deposited and the activities of the catalyst at 250, 300 and 350° C. were measured for the oxidation catalyst, and the amounts of deposited carbon and silica were measured for the highly activated alumina.

The amount of the carbon deposited was measured by an element analyzer (made by Yanagimoto Seisakusho Co., Ltd., trade name: CHN coder), and the amount of silica deposited by X-ray fluorescent analyzer.

The catalytic activity of the oxidation catalyst was evaluated by measuring the oxidation rate of toluene. That is, a model gas consisting of 1,000 ppm (v/v) of toluene and the remaining air was used, the model gas was passed through the oxidation catalyst under the condition of a space velocity (SV) being 20,000 hr$^{-1}$, and the oxidation rates of the toluene at the above each temperature were measured and thereby the treatment efficiency was determined. Thus, it means that toluene was perfectly oxidized that the oxidation catalyst activity is 100%. The results are shown in Table 1.

EXAMPLE 2

An exhaust gas-treating test was carried out in the same manner as in Example 1 except the amount of palladium deposited on the highly activated alumina was changed to 0.1 wt. %.

The results are shown in Table 1.

EXAMPLE 3

An exhaust gas-treating test was carried out in the same manner as in Example 1 except the amount of palladium deposited on the highly activated alumina was changed to 0.05 wt. %.

The results are shown in Table 1.

EXAMPLE 4

The same gamma-alumina as used in Example 1 was impregnated in an aqueous manganese nitrate solution. After air-drying, the resulting alumina was dried at 150° C. for 4 hours and then calcined in an air atmosphere at 450° C. for 2 hours to prepare a highly activated alumina deposited with 1 wt. % of manganese oxide.

An exhaust gas-treating test was carried out in the same manner as in Example 1 except that the alumina deposited with manganese oxide was used as the highly activated alumina and the temperature of the pre-treatment layer inlet of 350° C. was adopted.

The results are shown in Table 1.

COMPARATIVE EXAMPLE 1

An exhaust gas-treating test was carried out in the same manner as Example 1 except that a layer packed with gamma-alumina having an average particle size of 3.2 mm was used as the pre-treatment layer.

The results are shown in Table 1.

After the exhaust gas-treating test, differential thermal analysis of the resulting gamma-alumina and, as a result the ignition point thereof was estimated to be about 430° C. A burning test was actually carried out under an air stream, whereby it was ascertained that abrupt combustion and heat emission occur at nearly the same temperature.

TABLE 1

| | Pre-treatment layer Amount deposited (wt. %) | | Oxidation catalyst-packed layer | | | |
|---|---|---|---|---|---|---|
| | | | Amount deposited (wt. %) | Catalytic activity of oxidation (%) | | |
| | Carbon | Silica | Silica | 250° C. | 300° C. | 350° C. |
| Example 1 | 0.05 | 0.44 | 0.02 | 99.5 | 99.9 | 99.9 |
| Example 2 | 0.10 | 0.43 | 0.03 | 99.0 | 99.8 | 99.9 |
| Example 3 | 2.50 | 0.39 | 0.10 | 90 | 98 | 99.5 |
| Example 4 | 0.50 | 0.42 | 0.04 | 98 | 99.5 | 99.8 |
| Comparative Example 1 | 7.50 | 0.23 | 0.20 | 80 | 95 | 98 |

It is understood from the results of Table 1 that by carrying our the pre-treatment using the highly activated alumina-packed layer of the present invention the organosilicon compounds and tar-like substances as catalyst poisons are effectively removed and further the catalytic activity of the oxidation catalyst for exhaust gas treatment is maintained in a high level.

EXAMPLE 5

As the oxidation catalyst for exhaust has treatment was used the oxidation catalyst wherein 0.25 wt. % of platinum was deposited granular gamma-alumina having an average particle size of 55 mm $\phi$ and a specific surface area of 250 m$^2$/g. Then, 2 m$^3$ of this oxidation catalyst was packed into the reaction to form an oxidation catalyst-packed layer having a layer length of 100 mm. On the other hand, as the highly activated alumina for removal of catalyst poisons was used the highly activated alumina wherein 0.2 wt. % of palladium was deposited on gamma-alumina having an average particle size of 3.2 mm $\phi$ and a specific surface area of 250 m$^2$/g. Then, 2 m$^3$ of this highly activated alumina was packed into the previous part of the above oxidation catalyst layer at intervals of 80 mm to form a highly activated alumina-packed layer having a layer length of 100 mm, whereby an exhaust gas purification apparatus was obtained.

An exhaust gas from steps of preparation of flame retardant resin-laminated plates containing as catalytic poisons 100 to 200 mg/Nm$^3$ of organophosphorus compounds and tar-like substances and 1,700 ppm of methanol was passed through the above exhaust gas purification apparatus under the conditions of a highly activated alumina-packed layer inlet temperature of 280° C., an oxidation catalyst-packed layer outlet temperature of 550 ±20° C. and a space velocity (SV) of 20,000 hr$^{-1}$.

The methanol removal rate at the start of reaction was 99.9 %, the methanol removal rate after time lapse of three months from the start was 99.8 % and thus catalyst deterioration was scarcely observed. After time lapse of further three months, the reaction was temporarily interrupted and the condition of adhesion of carbon in the highly activated alumina-packed layer and the oxidation catalyst-packed layer was investigated, but adhesion of carbon was scarcely observed.

COMPARATIVE EXAMPLE 2

An exhaust gas-purifying test was carried out in the same manner as in Example 5 except that a layer packed with gamma-alumina having an average particle size of 3.2 mm $\phi$ and a specific surface area of 250 m$^2$/g was arranged in place of the highly activated alumina-packed layer without an interval between the layer and the oxidation catalyst-packed layer. A SUS gauze was placed between the alumina-packed layer and the oxidation catalyst-packed layer.

Since abnormal increase of the outlet temperature of the oxidation catalyst-packed layer was observed one month after the start of reaction, the reaction was stopped and the inside of the apparatus was observed. As result were found sintering of gamma-alumina in the alumina-packed layer and the damage by burning of the SUS gauze placed between the alumina-packed layer and the oxidation catalyst layer.

The analysis of non-sintered gamma-alumina in the alumina-packed layer revealed the adhesion of carbon and ter-like substances in an amount of 6 to 8 wt. % in terms of carbon based on the weight of gamma-alumina. The differential thermal analysis of the gamma-alumina revealed that the ignition temperature of the above carbon and tar-like substances was 350 to 400° C.

It is estimated from the above results that the tar-like substances were not sufficiently decomposed in the alumina-packed layer and gradually carbonized and deposited, and on the other hand, the combustion heat of methanol in the oxidation catalyst-packed layer was transferred to the alumina-packed layer by heat transfer, radiation, etc. via the contact face of the alumina-packed layer with the oxidation catalyst-packed layer, induced the ignition of carbon and tar-like substances deposited in a large amount and caused the sintering of the alumina and the burning of the SUS gauze.

COMPARATIVE EXAMPLE 3

An exhaust gas-purification test was carried out in the same manner as in Example 5 except that a layer packed with gamma-alumina having an average particle size of 3.2 mm $\phi$ and a specific surface area of 250 m$^2$/g was arranged in place of the highly activated alumina-packed layer at intervals of 80 mm between the layer and the oxidation catalyst-packed layer.

The methanol removal rate at the start of reaction was 99.9% and the methanol removal rate after time lapse of three months was 99.5%. Adhesion of carbon and tar-like substances was observed in the alumina-packed layer after time lapse of three months and thus it was revealed that the tar-like substances were not completely removed by decomposition and were deposited in the alumina-packed layer.

Effect of the Invention

According to the present invention, as catalyst poisons contained in exhaust gases can effectively be removed by the pre-treatment using the highly activated alumina, it is possible to prevent poisoning of the oxidation catalyst for exhaust gas treatment and maintain its performances for a long period of time. There can be obtained by this increase of catalyst life a large economical merit that the interval of change of the oxidation catalyst for exhaust gas treatment can greatly be extended.

Further, as tar-like substances can effectively be removed by the pre-treatment using the highly activated alumina, there can be avoided problems of deterioration of the catalyst by combustion of the tar-like substances accompanied by intense heat emission, damage of the apparatus and the like.

Further, as the highly activated alumina-packed layer and the oxidation catalyst-packed layer are separately arranged in the exhaust gas purification apparatus of the invention, it is possible to prevent the ignition and combustion of carbon in the highly activated alumina-packed layer and thus it is possible to solve various problems such as deterioration of the catalyst and damage of the apparatus due to the ignition and combustion of carbon.

Thus, the exhaust gas purification method and apparatus therefore of the present invention are extremely useful in the field of exhaust gas treatment technique.

We claim:

1. A method of purifying an exhaust gas containing organic compound and catalyst poison(s) comprising at least one of silicon compounds or organophosphorus compounds which comprises passing the gas in the presence of molecular oxygen through a layer packed with a highly activated alumina which comprises activated alumina having deposited thereon at least one catalyst component selected from the group consisting of noble metals and oxides of heavy metals, to remove the catalyst poison(s) and thereafter subjecting the treated gas to a catalytic treatment to further purify the gas.

2. The method of claim 1 which comprises passing the gas through the layer packed with the highly activated alumina to remove the catalyst poison(s) and then passing the resulting gas through a layer packed with an oxidation catalyst to remove harmful substance(s) contained therein.

3. The method of claim 1 wherein the amount deposited of the at least one catalyst component is 0.05 to 2 wt. % of the alumina.

4. The method of claim 2 wherein the layer packed with the highly activated alumina and the layer packed with an oxidation catalyst are separated by from 10 to 200 mm.

5. The method of claim 2 wherein the step of passing the exhaust gas containing catalyst poison(s) through the layer packed with highly activated alumina is carried out at a temperature of from about 130 to about 500° C., under normal pressure, at a space velocity of about 10,000 to 50,000 $hr^{-1}$ in the presence of molecular oxygen.

6. The method of claim 1 wherein said exhaust gas containing catalytic poison(s) comprises exhaust gases containing organic solvents from a drying oven.

7. The method of claim 1 wherein the exhaust gas contains xylene or toluene.

8. The method of claim 1 wherein the exhaust gas contains acetic esters.

9. The method of claim 1 wherein the exhaust gas contains naphtha.

10. The method of claim 1 wherein the exhaust gas contains organophosphorus compounds and terr substances.

11. A method for purifying an exhaust gas which contains silicon and hydrocarbons as catalyst poisons which comprises passing the gas containing said catalyst poisons through a layer packed with a highly activated alumina having deposited thereon at least one catalyst component selected from the group consisting of noble metals and oxides of heavy metals, to remove the catalyst poisons, and thereafter subjecting the treated gas to a catalyst treatment to further purify the gas.

* * * * *